United States Patent [19]

Parker

[11] 4,041,538
[45] Aug. 9, 1977

[54] LOW NOISE MAGNETIC TRANSDUCER PREAMPLIFIER HAVING FLAT RESPONSE

[75] Inventor: Robert R. Parker, Des Plaines, Ill.

[73] Assignee: Bell & Howell Company, Chicago, Ill.

[21] Appl. No.: 676,237

[22] Filed: Apr. 12, 1976

[51] Int. Cl.$^2$ .............................................. G11B 5/02
[52] U.S. Cl. ...................................... 360/67; 360/66
[58] Field of Search ................... 360/67, 66, 123, 124, 360/118

[56] References Cited

U.S. PATENT DOCUMENTS

| | | | |
|---|---|---|---|
| 3,027,549 | 3/1962 | Allen | 360/67 |
| 3,530,257 | 9/1970 | Brown | 360/66 |
| 3,564,160 | 2/1971 | Temes | 360/66 |
| 3,666,893 | 5/1972 | Fujiwara | 360/66 |
| 3,683,131 | 8/1972 | Hodder | 360/67 |
| 3,838,452 | 9/1974 | Royce | 360/66 |

OTHER PUBLICATIONS

Transistor Tape Preamplifier – Wireless World, 12/58, p. 572, "Use of Head Inductance in a Feedback Circuit", Ridler.

Primary Examiner—Jay P. Lucas
Attorney, Agent, or Firm—John R. Hoffman; Robert J. Schneider; Roger M. Fitz-Gerald

[57] ABSTRACT

A playback preamplifier for use on a recording machine utilizing a magnetic recording medium to provide a substantially flat response between a general range of 200 to 6000 Hz. and having a substantially improved signal-to-noise ratio. The circuit includes a three stage amplifier having an overall DC feedback loop. The magnetic transducer is connected in the feedback loop so that the DC feedback current biases the transducer with the DC feedback current.

11 Claims, 4 Drawing Figures

LOW NOISE MAGNETIC TRANSDUCER PREAMPLIFIER HAVING FLAT RESPONSE

BACKGROUND OF THE INVENTION

1. Field of the Invention

This invention relates to a recording machine playback amplifier, and, in particular, to a circuit having an improved signal-to-noise ratio.

2. Brief Description of the Prior Art

Many magnetic recording/playback machines have been developed and have enjoyed a great deal of commercial success. These types of machines have included large, reel-to-reel recorders, cassette recorders, and card readers wherein the recording medium comprises a strip of material which is moved by some transport mechanism past the recording/playback head. Recording devices of this type are particularly affected by many sources of noise, such as extraneous signals, hiss developed by the recording medium as it passes the head, and by noise generated by its internal components such as resistors and the like.

SUMMARY OF THE INVENTION

An object of the present invention is to provide a new and improved playback preamplifier having flat output response characteristics and an improved signal-to-noise ratio.

In accordance with the above and other objects, the present invention includes a preamplifier circuit for use on a recording machine which provides a substantially flat response between a general range of 200 and 6000 Hz. and has a substantially improved signal-to-noise ratio. The circuit includes a three stage amplifier having an overall DC feedback loop. The magnetic transducer is connected in the feedback loop so that the DC feedback current biases the transducer with the DC feedback current.

Other objects, features and advantages of the invention will be apparent from the following detailed description taken in connection with the accompanying drawings.

DESCRIPTION OF THE PREFERRED EMBODIMENT

Figure 1:
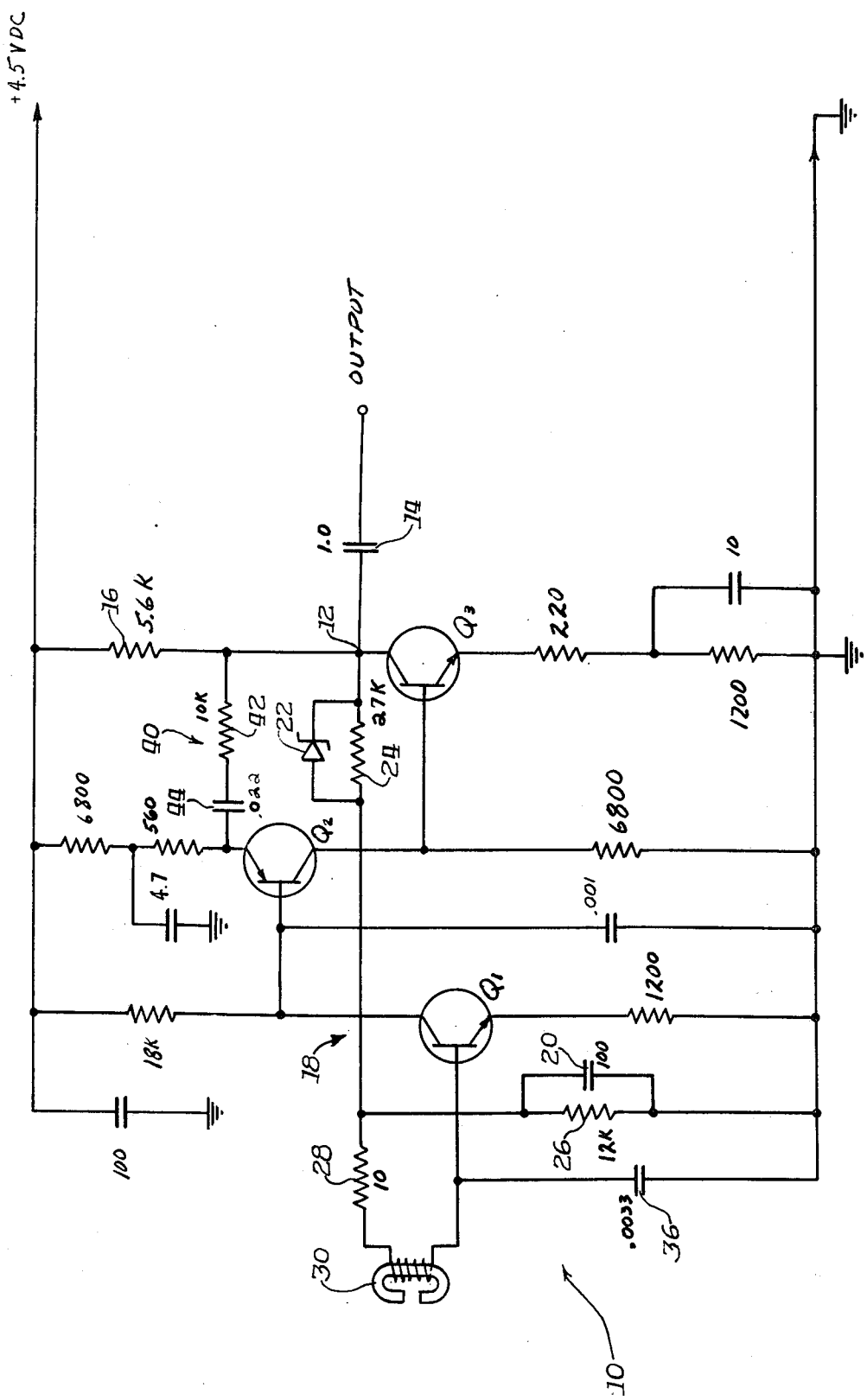
FIG. 1 is an electrical diagram of the playback preamplifier of the present invention.

The playback preamplifier circuit, generally designated 10, of the present invention is shown in FIG. 1. The circuit is designed for use with a recording/playback machine which utilizes a magnetic recording medium. Therefore, the circuit is suitable for reel-to-reel tape recorders, cassette recorders, and 8-track units. However, as shown and described in the present invention, the circuit is used in a card reading type teaching machine such as that shown and described in U.S. Pat. No. 3,869,718 assigned to the assignee of the present invention, which patent is hereby incorporated by reference. The playback preamplifier is the subject of the present invention and therefore the details and elements used therewith in the recording mode have been deleted in an attempt to simplify the present disclosure in order to clearly point out the present invention.

The disclosure of the present invention herein is that of a preferred embodiment of the circuit which has been developed and tested as used in a card reading type teaching machine. As will be recognized by those skilled in the art, while the disclosure is given in precise and particular terms which specifically identify the elements as having a particular value, these elements are meant to be exemplary only and no limitations to the scope of the invention should be understood therefrom.

The circuit includes a three stage amplifier comprising transistors Q1, Q2 and Q3. The transistors Q1 and Q3 are of the NPN type such as transistor 2N5089 while Q2 is a PNP type transistor such as 2N5087. The transistors are cascaded collector to base as shown. The output from the preamplifier is taken from an output terminal 12 through a capacitor 14 to a subsequent power amplifier. According to conventional practice, a variable resistor may be used to provide a volume control for the sound output.

The preamplifier is powered by a 4.5 volt DC source, shown at the top of the drawing, through a resistor 16 to the output terminal 12 of the preamplifier 10. A feedback loop, generally designated 18, connects the output terminal 12 with the base of transistor Q1 which defines the input terminal. The "turn on time" of the preamplifier 10 is determined by the time required to charge capacitor 20 and can be substantially reduced by the use of a Zener diode 22 in the DC feedback loop. A suitable Zener diode is 1N749A which has a Zener voltage of 4.3 volts. At turn on, 4.3 volts are impressed on the Zener diode as the capacitor 20 charges to .72 volts. As the preamplifier 10 turns on, the voltage across the Zener diode 22 drops to 1.2 volts, effectively open circuiting the Zener diode and inserting the resistor 24 in the feedback loop circuit 18. The turn on time for the preamplifier 10 as shown is approximately 180 milliseconds while the leakage through the Zener diode 22 is minute, approximately 1 micro amp, compared to the 45 micro amps through the resistor 24 after charging of the capacitor 20.

The capacitor 20 is connected in parallel with a 12 k resistor 26 between the feedback loop and ground to maintain .72 volts of DC current in the feedback loop during stable operation. A 10 ohm resistor 28 is serially connected with a magnetic transducer 30 and the base of transistor Q1 to complete the feedback loop. During stable operation, approximately 0.2 micro amps of DC current through the head coil provides a very small DC head bias.

As will be described in detail hereinafter, in the present application, the preamplifier 10 is used on a teaching machine in which oral signals are recorded and played back to a student user. Thus, preamplifier 10 is designed to provide a substantially flat response for a target frequency range generally between 200 and 6000 Hz. and any signals having a substantially higher frequency are considered to be unimportant. It has been found in testing that the 0.2 micro amp DC head bias does not affect or deteriorate any signals on the recording medium within the target frequency response but has been found to provide a beneficial signal-to-noise ratio improvement.

Figure 2:
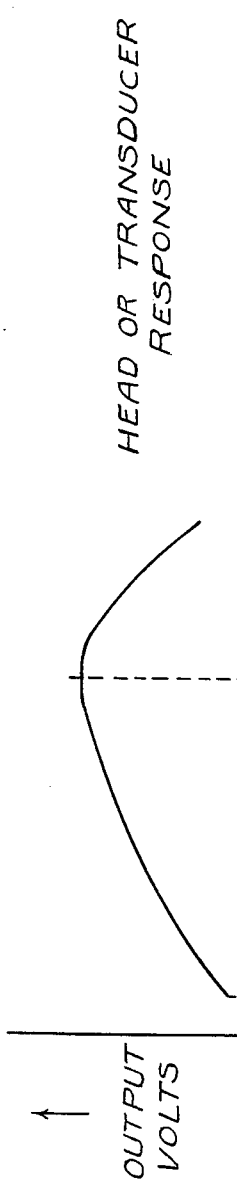
FIG. 2 is a graph of the transducer response curve as a function of frequency.
Figure 3:
FIG. 3 is a similar graph of the preamplifier response as a function of frequency.
Figure 4:
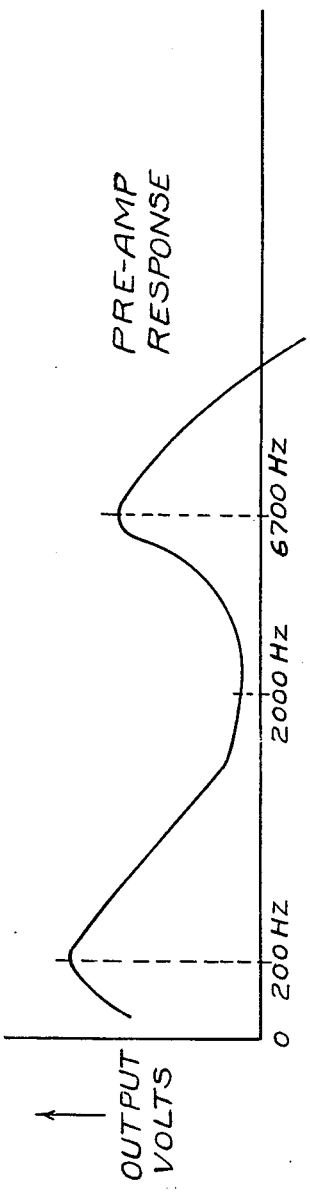
FIG. 4 is a graph representing the overall combined output from the circuit.

FIGS. 2, 3 and 4 represent voltage output of the individual components as a function of frequency. FIG. 2 shows the output of the transducer as a function of frequency which is initially very small and increases to a peak output at approximately 2000 Hz.

FIG. 3 shows the output of the three stage preamplifier. The particular response curve chosen has a peak output at approximately 200 Hz. which decreases rapidly to a minimum at 2000 Hz. as shown on the left of the graph.

The slopes between the two curves (FIGS. 2 and 3) between 200 Hz. and 2,000 Hz. are approximately opposite so that they combine to provide a substantially flat response (FIG. 4) in the 200 to 2,000 Hz. range.

The output of the transducer alone decreases rapidly after its peak point at 2,000 Hz. and therefore it is desirable to utilize the resonant effect of the transducer 30 in an attempt to maintain a flat response up to approximately 6 k Hz. Referring to FIG. 1, a capacitor 36 is connected between the base of Q1 and ground. The value of the capacitor 36 is 0.0022 micro farads. This capacitor in combination with the transducer 30 provides a large voltage peak at resonance which greatly increases the transducer output beginning at approximately 2,000 Hz. to a peak value at approximately 6,700 Hz. and decreases rapidly thereafter. By summing the curves of FIGS. 2 and 3, the combined curve for the preamplifier and head is shown in FIG. 4 to be substantially flat between 200 and 6000.

A second feedback loop, generally designated 40, around transistor Q2 and Q3 provides the low frequency boost. The feedback circuit 40 is connected between the output terminal 12 and the emitter of Q2 and includes a 10 kilo ohm resistor 42 and a 0.022 micro farad capacitor 44. The ohm values of the remaining resistors in the preamplifier circuit 10 are shown in the drawings as well as the values of the other components and need not be explained in detail herein.

In one embodiment which has been tested, the signal-to-noise ratio of the overall preamplifier circuit 10 has been found to be 65 db. This is a significant improvement, aproximately 8 db over prior art preamplifiers. The increased signal-to-noise ratio is due to a combination of factors, all of which are not completely understood. For example, a conventional preamplifier of this type would normally include a feedback resistor across the collector and base of Q1 and an appropriate input base resistor between the base Q1 and ground. By providing a feedback loop around all of the transistors Q1, Q2 and Q3, these conventional resistors have been eliminated. Resistors of this type normally produce a significant amount of internal noise which lowers the sound-to-noise ratio, and their removal enhances the signal-to-noise ratio of the entire circuit. Furthermore, the elimination of the input base resistor provides a substantially higher input impedance to Q1, approximately 50 times higher than with a conventional preamplifier. The DC current in the head is believed to oppose some noise generating components and additionally enhance the overall signal-to-noise ratio. Therefore, the preamplifier 10 provides a flat response in the target frequency range while maintaining a very respectable signal-to-noise ratio.

While the above description of the preferred embodiment has been given with respect to particular elements and values therefor, it should be understood that these specific elements have been used by way of explanation and are not intended in any way to limit the above disclosure. It would be obvious to one of ordinary skill in the art to make many changes and modifications to the above without departing from the spirit and scope of the present invention.

The foregoing detailed description has been given for clearness of understanding only and no unnecessary limitations as to the specific component values should be understood therefrom since many modifications and changes to the circuit would be obvious to those skilled in the art while not departing from the spirit and scope of the invention as specifically defined in the following claims.

I claim:

1. An improved reproduction preamplifier in a machine utilizing a magnetic recording medium, comprising:
   a reproduction amplifier circuit including at least one transistor and having an input terminal and an output terminal;
   a feedback loop between said output terminal and said input terminal; and
   a magnetic playback transducer connected in a direct current series circuit with said feedback loop and said input and output terminals whereby direct current feedback current provides a predetermined direct current bias level for the magnetic playback transducer.

2. The preamplifier of claim 1 when said preamplifer circuit includes three transistors.

3. The preamplifier of claim 1 wherein said feedback loop is connected to ground by a capacitor and includes a serially connected Zener diode providing a relatively short charge time for said capacitor.

4. An improved reproduction preamplifier in a machine utilizing a magnetic recording medium, comprising:
   a three stage amplification circuit including three cascaded transistors and having an output terminal at the collector of the last transistor and in input terminal at the base of the first transistor;
   a direct current feedback loop between said output terminal and said input terminal; and
   a magnetic transducer in series with said feedback loop and said input terminal whereby the DC feedback current provides a DC bias level for the transducer.

5. The preamplifier of claim 4 wherein said feedback loop is coupled to a source of common potential through a capacitor and includes a serially connected Zener diode providing a relatively short charge time for said capacitor.

6. The preamplifier of claim 5 including a capacitor connected between said input terminal and ground to complement the resonant effect of the transducer and lower the input impedance to the first transistor above a predetermined frequency.

7. The preamplification circuit of claim 6 wherein said feedback loop includes an additional resistor to attenuate the DC feedback current to the head.

8. An improved reproduction preamplifier in a teaching medium utilizing a magnetic recording medium, to provide an increased signal-to-noise ratio in an output signal between about 200 and about 6000 Hz., comprising:
   a circuit including three cascaded transistors;
   a DC feedback loop between the collector of the last transistor and the base of the first transistor; and
   a magnetic transducer in series with said DC loop and said input terminal whereby the DC feedback current provides a DC bias level for the transducer.

9. The preamplifier of claim 8 wherein said feedback loop is coupled to ground by a capacitor and includes a serially connected Zener diode providing a relatively short charge time for said capacitor.

10. The preamplifier of claim 8 including a capacitor connected between said input terminal and ground to complement the resonant effect of the transducer and lower the input impedance to the first transistor above a predetermined frequency.

11. The preamplification circuit of claim 8 including a resistor in said feedback loop to limit the DC transducer bias current to approximately 0.2 micro amps.

* * * * *

UNITED STATES PATENT OFFICE
CERTIFICATE OF CORRECTION

PATENT NO. : 4,041,538
DATED : August 9, 1977
INVENTOR(S) : LOW NOISE MAGNETIC TRANSDUCER PREAMPLIFIER HAVING FLAT RESPONSE It is certified that error appears in the above-identified patent and that said Letters Patent are hereby corrected as shown below:

Column 4, line 26 (Claim 2, line 1) change "when" to --wherein--.

Column 4, line 37 (Claim 4, line 6) change "in" to --an--.

Column 4, line 59 (Claim 8, line 2), change "medium" to --machine--.

Signed and Sealed this

Fifteenth Day of May 1979

[SEAL]

Attest:

RUTH C. MASON
Attesting Officer

DONALD W. BANNER
Commissioner of Patents and Trademarks